June 22, 1948. T. C. BAKER 2,443,674
METHOD OF COOLING HOLLOW GLASS ARTICLES, SUCH AS BOTTLES
Filed April 25, 1942
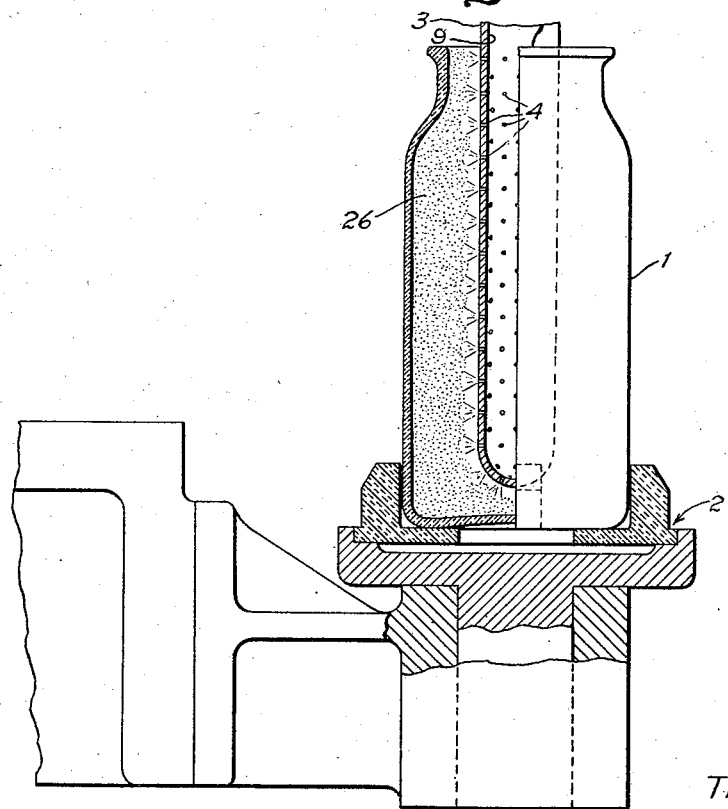
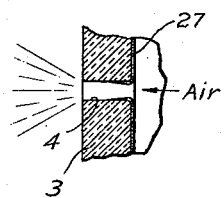
Inventor:
Theodore C. Baker
by Brown + Parham
Attorneys.
Witness:
A. A. Horn.

Patented June 22, 1948

2,443,674

UNITED STATES PATENT OFFICE 2,443,674

METHOD OF COOLING HOLLOW GLASS ARTICLES, SUCH AS BOTTLES

Theodore C. Baker, Newington, Conn., assignor to Hartford-Empire Company, Hartford, Conn., a corporation of Delaware Application April 25, 1942, Serial No. 440,558

3 Claims. (Cl. 49—89)

This invention relates to the art of cooling glassware, particularly hollow glass articles such as bottles, as from a temperature substantially above to a temperature below the strain point of the glass of such an article to effect tempering thereof.

In order to effect more rapid cooling of a glass article through its tempering temperature range than can be accomplished by the use of a cooling fluid consisting of compressed air or other suitable gas alone, it has been proposed to add water in a finely divided state or spray to the air or other gas. There are, however, serious difficulties to be overcome before this proposal can be satisfactorily carried into effect in a tempering operation which involves the necessity of rapidly cooling or chilling the internal surface of a hollow glass article such as a bottle.

In such a tempering operation, the cooling is to be applied to a number of different portions of the internal surface of the hollow glass article to be tempered and the glass cooling effect required at some of these portions may be different than that required at others. A nozzle projecting into such a hollow article and provided with jet holes or discharge openings of a predetermined size or sizes and located at predetermined places longitudinally and/or circumferentially of the nozzle therefore is necessary or desirable for use to apply the cooling fluid in a distributed manner to the internal surface of the hollow glass article to be tempered. A serious difficulty in the way of successful use of a cooling fluid consisting of water spray in the air or gas under pressure supplied to such a nozzle is that the liquid particles will not remain separate and distributed throughout the currents or streams of air or gas passing through the bore of the nozzle to and through the nozzle discharge openings or jet holes. Instead, such water particles tend to accumulate in undesirably large drops or masses, the presence of which in or on the nozzle interferes with the intended distribution of cooling fluid to the several portions of the internal surface of the hollow glass article to be tempered. The undesired drop or masses of liquid may locally chill portions of the fall of the glass article so as to cause checking or fracture thereof.

An object of the present invention is to obviate or substantially reduce difficulties such as those above pointed out as being inherent in a cooling fluid consisting of water spray carried by air or other gas under pressure.

A further object of the invention is to provide a glass cooling fluid of the water spray type which will be suitable for effective application by a nozzle to the internal surface of a bottle or other hollow glass article.

I attain the foregoing and other objects of the invention by mixing a suitable wetting agent with the water to be atomized in forming a water spray glass cooling fluid for use in tempering bottles or other hollow glass articles. The wetting agent serves to reduce the surface tension of the water and not only promotes the formation of finer and more mist for given amounts of water and air but also improves the action of the liquid components of such mist during the passage thereof through the bore of a tempering nozzle to and through the discharge openings or jet holes of such nozzle. Specifically, the film of liquid on the wall of the nozzle bore will be thinner and more uniform throughout the entire area of that wall. Such film will supply liquid uniformly to each discharge opening or jet hole at all points around the inner end thereof, rather than in an objectionably large drop or mass at one side of such discharge opening or jet hole as was likely to occur in the water spray cooling fluids of prior proposals. Re-atomization of liquid from the film on the wall of the nozzle bore will take place at the inner end of each discharge opening or jet hole and will not be retarded or the resultant spray made coarse and non-uniform by excessive masses or drops of liquid which in prior proposals temporarily may partially or completely obstruct such an opening or jet hole.

The nozzle and the glass article to be cooled may be supported in cooperative relation with each other by any suitable known or preferred supporting and operating mechanism. The details of any such mechanism are immaterial so far as the method of the present invention is concerned. An understanding of the method of the invention will be aided by the accompanying drawings, in which:

Figure 1 is a fragmentary view, partly in elevation and partly in vertical section, showing a nozzle and a hollow glass article in cooperative relation with each other, the article being shown as resting upon a support; and Fig. 2 is a relatively enlarged fragmentary vertical sectional view of a portion of the wall of the tempering nozzle showing a film of liquid on the inner surface thereof around a jet hole in such wall.

As shown in Fig. 1, a hollow glass article 1, the internal surface of which is to be chilled, stands in an upright position upon a support 2. A tempering nozzle 3 depends within the hollow glass article 1 in axial alignment therewith. The tempering nozzle 3 is provided with jet holes 4 through its wall.

Only the portion of the nozzle that depends into the glass article and is provided with jet holes is shown as such nozzle may be substantially like any suitable known tempering nozzle, as for example, the nozzle body shown in Patent No. 2,345,808, of April 4, 1944, to Thomas D. Green. The bore or internal chamber of the tempering nozzle is designated 9 in Fig. 1 and may be supplied with mist of the character described in any suitable known manner, no means therefor being shown.

The air-water-wetting agent spray will be blown throughout the internal chamber or bore 9 of the tempering nozzle and discharge from this spray will take place through the jet holes 4 so as to subject the internal surface of the hollow glass article 1 to a fine, well distributed, cooling mist, indicated at 26. The liquid component of the spray will in part accumulate as a film, indicated at 27 in Fig. 2, on the inner wall of the tempering nozzle. The addition of the wetting agent to the water will keep this film relatively thin and uniform throughout the entire area of the inner wall of the nozzle. In consequence, the out-rush of air and entrained liquid through the jet hole will continuously atomize liquid from the film at the inner edge and end portion of the jet hole.

There are many different wetting agents which may be used to reduce the surface tension of water so that the latter may be used in a water spray cooling fluid suitable for application by a nozzle to the internal surface of a hollow glass article in accordance with the present invention. Examples of such wetting agents are soap, caprylic alcohol, sodium oleate, glycerine and various commercial products, such as "drene" which are sold on the market under trade names or trade-marks. The wetting agent selected may be added to the water and the resultant product atomized in any suitable known way by any suitable known means and supplied to the tempering nozzle.

The ratio of wetting agent to the water component may vary with the wetting agent and to a considerable degree for the same wetting agent. With the wetting agent specifically named, good results may be obtained by using one part wetting agent to one hundred to one thousand parts water and some of the commercial types of wetting agents may be diluted much more, as by using one part of such a wetting agent to as much as ten thousand parts water. The important point is that enough of the particular wetting agent selected should be used to reduce the surface tension thereof sufficiently to obviate or substantially reduce the difficulties attendant upon attempted use of water alone in a spray type of cooling fluid for use in tempering glassware.

The principle of the invention may be employed to effect desirable reduction of surface tension of the main liquid component of any other gas-liquid spray cooling fluid that it is desired to use in tempering glassware and which would be unsuitable for such use without the addition thereto of a suitable wetting agent.

I claim:

1. The method of cooling a heated hollow glass article by applying a cooling fluid of the liquid spray type through a nozzle provided with jet holes to the interior of such article when it is at a temperature above the strain point of the glass thereof, comprising the steps of adding a wetting agent to water, atomizing the resultant product, and spraying the atomized product from the nozzle through the jet holes thereof onto the inner surface of said hollow glass article.

2. The method of cooling a heated hollow glass article, such as a bottle, by applying a cooling fluid of the liquid spray type through a nozzle provided with jet holes to the interior of the hollow glass article when the latter is at a temperature above the strain point of the glass thereof, comprising the steps of adding a small amount of a wetting agent to water to reduce the surface tension thereof, atomizing the resultant product and discharging jets of the atomized product through the jet holes of the nozzle onto the inner surface of said hollow glass article.

3. The method of cooling a heated hollow glass article, such as a bottle, by applying a cooling fluid of the liquid spray type through a nozzle provided with jet holes to the interior of such glass article when it is at a temperature substantially above the strain point of the glass thereof, which comprises providing a mist of water to which a small amount of a wetting agent for the water has been added and air under pressure within said nozzle, and discharging jets of said mist from the nozzle through the jet holes thereof onto the inner surface of said hollow glass article.

THEODORE C. BAKER.

REFERENCES CITED

The following references are of record in the file of this patent:

UNITED STATES PATENTS

| Number | Name | Date |
| --- | --- | --- |
| 2,066,283 | Wadman | Dec. 29, 1936 |
| 2,079,793 | Donlan | May 11, 1937 |
| 2,131,406 | Mosmieri et al. | Sept. 27, 1938 |
| 2,265,308 | Perry et al. | Dec. 9, 1941 |
| 2,285,595 | Littleton et al. | June 9, 1942 |

FOREIGN PATENTS

| Number | Country | Date |
| --- | --- | --- |
| 3,307 | Great Britain | A. D. 1875 |
| 4,372 | Great Britain | A. D. 1874 |
| 107,512 | France | Apr. 2, 1875 |

OTHER REFERENCES

"Steel Treating Practice," Sherry. Published by McGraw-Hill Book Co., Inc., N. Y., 1929. Page 116. (Copy in Div. 3.)